United States Patent
Liu et al.

(10) Patent No.: US 11,155,286 B1
(45) Date of Patent: Oct. 26, 2021

(54) PASSENGER COMMUNICATION OUTPUT CONTROL CIRCUIT FOR UNMANNED METRO TRAIN

(71) Applicant: CRRC Nanjing Puzhen Co., Ltd., Nanjing (CN)

(72) Inventors: Guofei Liu, Nanjing (CN); Qi Gao, Nanjing (CN); Meng Shi, Nanjing (CN); Xianing Pan, Nanjing (CN); Rujun Liang, Nanjing (CN); Yaozheng Zeng, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 316 days.

(21) Appl. No.: 16/483,444

(22) PCT Filed: Sep. 27, 2018

(86) PCT No.: PCT/CN2018/107850
§ 371 (c)(1),
(2) Date: Aug. 5, 2019

(87) PCT Pub. No.: WO2020/037771
PCT Pub. Date: Feb. 27, 2020

(30) Foreign Application Priority Data

Aug. 21, 2018 (CN) .......................... 201810952666.5

(51) Int. Cl.
*B61L 15/00* (2006.01)
*H04L 12/40* (2006.01)

(52) U.S. Cl.
CPC ......... *B61L 15/0036* (2013.01); *B61L 15/009* (2013.01); *B61L 15/0072* (2013.01);
(Continued)

(58) Field of Classification Search
CPC ............. B61L 15/0036; B61L 15/0072; B61L 15/009; H04L 12/40; H04L 2012/40215; H04L 2012/40293
See application file for complete search history.

(56) References Cited

U.S. PATENT DOCUMENTS 3,260,553 A * 7/1966 Jeffrey .................. B60T 13/665
303/16
4,327,415 A * 4/1982 Rush ....................... B61L 27/04
246/187 C (Continued)

FOREIGN PATENT DOCUMENTS

CN 108001484 * 5/2018 .......... B61L 15/0036

*Primary Examiner* — Russell Frejd
(74) *Attorney, Agent, or Firm* — Bayramoglu Law Offices LLC

(57) ABSTRACT

The present disclosure relates to a passenger communication output control circuit for an unmanned metro train. The unmanned metro train is installed with passenger emergency communication units each having a communication button and a communication relay. The communication relay has a normally-closed contact pair and is linked with the communication button in a one-to-one correspondence. When the communication button is pushed down, the communication relay is energized to disconnect the normally-closed contact pair. The normally-closed contact pairs of all the coaches are connected in series to form an emergency communication circuit. Two terminals of the emergency communication circuit are respectively connected to a train power supply and an input/output module of a TCMS in the coach. When the passenger information system works normally, both a communication network and hardwire can transmitte the communication signal. When the two communication signals are inconsistent, the communication signal transmitted by hardwire shall prevail.

8 Claims, 1 Drawing Sheet

(52) U.S. Cl.
CPC .... *H04L 12/40* (2013.01); *H04L 2012/40215* (2013.01); *H04L 2012/40293* (2013.01)

(56) References Cited

U.S. PATENT DOCUMENTS

| | | | | |
|---|---|---|---|---|
| 2013/0325247 | A1* | 12/2013 | Kanner | B61L 15/0036 |
| | | | | 701/29.3 |
| 2017/0323739 | A1* | 11/2017 | Romero | H01H 3/161 |
| 2018/0056784 | A1* | 3/2018 | Virgilio | B60R 21/01 |

* cited by examiner

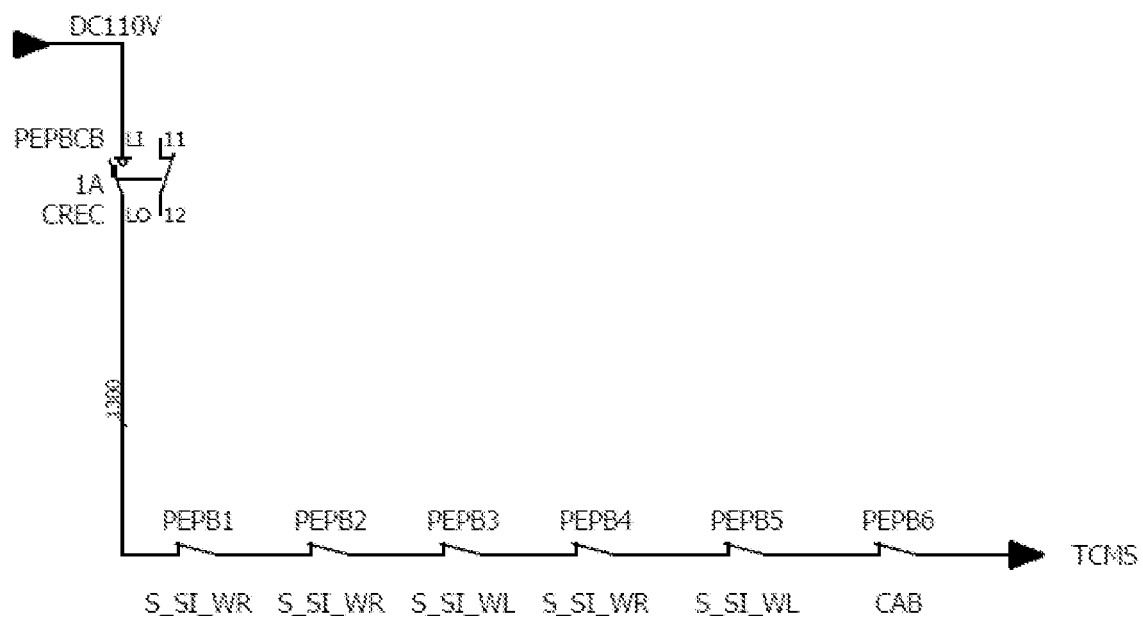

PASSENGER COMMUNICATION OUTPUT CONTROL CIRCUIT FOR UNMANNED METRO TRAIN

CROSS REFERENCE TO RELATED APPLICATIONS

This application is the national phase entry of International Application PCT/CN2018/107850, filed on Sep. 27, 2018 which is based upon and claims priority to Chinese Patent Application No. CN201810952666.5, filed on Aug. 21, 2018 the entire contents of which are incorporated herein by reference.

TECHNICAL FIELD

The present disclosure relates to the control of a passenger information system for a fully-automatic unmanned metro train, particularly to a passenger communication output control method for an unmanned metro train.

BACKGROUND

As the degree of digitization for the passenger information system of trains continues to evolve, communication between devices is basically realized by bus transmissions, so the reliability of the data transmission entirely depends on the logical reliability and stability of the software.

The key function of a passenger information system that matters the most is a passenger emergency communication unit which enables a driver/OCC (Operations Control Center) to timely learn the situation in the coach and know whether there is a passenger calling for a communication, on any occasion. In an automated driving mode, if a communication between the passenger information system and a train control management system (TCMS) fails, the call from passengers cannot be transmitted out. Each coach of the train is configured with multiple passenger emergency communication units (PECU). Passenger in any coach pushing an emergency button of the passenger emergency communication unit can cause the communication signal to be sent to the TCMS through hardwire, so it is ensured that the passenger is enabled to send out the communication signal, successfully.

When a passenger pushes the emergency button of the PECU to call the OCC, the communication signal is transmitted to a passenger information system (PIS) host of the coaches through a bus. The communication signal is transmitted by the PIS host of the coaches to a cab PIS host through a CAN (Controller Area Network) bus/an Ethernet bus, then transmitted to the TCMS through a multifunction vehicle bus (MVB) interface. The TCMS then transmits the calling signal to the OCC. The entire process is completely designed based on a software. Since the full-automatic unmanned driving is employed, the occurrence of unstable and unreliable operations of the software and the like will cause failure to send out passenger communication signal, thereby threatening the operational safety. Under an emergency, if the passenger's communication call cannot be output to the TCMS, the TCMS would not be able to send information to the OCC, and the OCC would lose contact with the passengers, which may possibly lead to casualties and severe accidents, and thus it is hazardous.

Of the many features of the unmanned metro train, safe and reliable operations of the train are of great importance. Moreover, a passenger emergency intercom function is required to meet an SIL1 (safety integrity level 1) safety integrity level certification. Therefore, after the reliability of the system communication is ensured, a backup hardwire retaining key functions should be designed, so the working staff in the OCC could have access to learning the situation of the train even in case of software malfunction.

SUMMARY

It is a main objective of the present disclosure to provide a passenger communication output control circuit for the unmanned metro train in consideration of the drawbacks of the prior art.

To solve the technical problems described above, the present disclosure provides a passenger communication output control circuit for an unmanned metro train, the unmanned metro train being installed with passenger emergency communication units, each of the passenger emergency communication units having a communication button, wherein each of the passenger emergency communication unit further includes communication relays, each of the communication relays has a normally-closed contact pair linked to the communication button in a one-to-one correspondence, when the communication button is pushed down, the corresponding communication relay is energized to disconnect the normally-closed contact pair, the normally-closed contact pairs of the communication relays of all coaches of the metro train are connected in series to form an emergency communication circuit, and two terminals of the emergency communication circuit are respectively connected to a train power supply and an input/output module of the TCMS in the coaches of the metro train.

The present disclosure further relates to a passenger communication output control method for the unmanned metro train by using the passenger communication output control circuit, wherein when the communication button of the passenger emergency communication unit is pushed down by a passenger, a normally-closed auxiliary contact pair linked to the communication button is disconnected, the emergency communication circuit connected to the input/output module of the TCMS in the corresponding coach is cut off, and the TCMS detects a circuit cut off signal to determine the coach where the communication request is sent out.

Additionally, the present disclosure further relates to an unmanned metro train configured with the above-mentioned passenger communication output control circuit.

The present disclosure further relates to an unmanned metro vehicle using the above-mentioned passenger communication output control method to process a passenger communication request.

Under network communication interruption, the communication information can still be output to the TCMS through the emergency communication circuit, so as to send the communication information to an operational control center (OOC) to make the OOC have access to learning the situation in the coach of the train in time, so embarkation staff can be appointed to solve the problems in time.

When the passenger information system works normally, the communication signal can be transmitted not only through the communication network, but also through hardwire. When the two communication signals are inconsistent, the communication signal transmitted by hardwire shall prevail. When the network is interrupted, the hardwire offering a redundancy can still output the communication signal, thereby greatly improving the reliability of the system.

BRIEF DESCRIPTION OF THE DRAWINGS

FIG. 1 is a schematic diagram of a passenger communication output control circuit for an unmanned metro train.

DETAILED DESCRIPTION OF THE EMBODIMENTS

The embodiments of the present disclosure are described hereinafter with reference to the drawings.

In an unmanned metro train, a pair of entrances of each coach of the train is provided with one passenger emergency communication unit (PECU). An A-type metro train having five pairs of entrance is provided with five passenger emergency communication units (PECU), while a B-type metro train having four pairs of entrance is provided with four passenger emergency communication units (PECU). Besides, a PECU is installed near an emergency exit of the driver's cab.

Taking, for instance, the first car of the A-type metro train in this embodiment, there are five pairs of entrances and one emergency exit of the driver's cab. The passenger communication output control circuit for an unmanned metro train includes the passenger emergency communication units provided near each pair of entrance of the coaches and near the emergency exit of the driver's cab. Each of the passenger emergency communication units includes a communication button, a processor, a communication speaker, a camera, a microphone, an indicator lamp, and a communication relay (the communication relay may be provided outside the passenger emergency communication unit). The communication speaker, camera, microphone, indicator lamp, and communication relay are connected to the processor. The communication button has a normally-open contact pair, and the communication relay has a normally-closed contact pair. When the communication button is pushed down, the normally-open contact pair is closed. After the processor receives the signal, the communication relay is driven to work (get energized), so as to disconnect the normally-closed contact pair of the communication relay. As shown in FIG. 1, according to the present embodiment, the first car of the train has six communication buttons (five of the communication buttons are located at the entrances of the coaches of the train, and one of the communication buttons is located at the emergency exit of the driver's cab). The normally-closed contact pairs (PEPB1, PEPB2, PEPB3, PEPB4, PEPB5, and PEPB6) of the communication relays of the six passenger communication units are connected in series to form an emergency communication circuit. An end of the emergency communication circuit is connected to an input/output module of a TCMS in the driver's cab, and the other end of the emergency communication circuit is connected to a metro train power supply via a passenger emergency push button circuit breaker (PEPBCB) in an electrical cabinet at the right side of the driver's cab. As for cars other than the first car of the train, the normally-closed contact pairs of the communication relays of the passenger communication units in all of the coaches of the train are connected in series to form an emergency communication circuit which is connected to the input/output module of the TCMS of the coaches. Alternatively, the normally-closed contact pairs of the five communication relays of the coaches of first car of the train may also be connected to the input/output module of the TCMS in the coaches, while the normally-closed contact pairs of the communication relays in the driver's cab may be directly connected to the input/output module of the TCMS in the driver's cab.

In the present embodiment, the normally-closed contact pairs of the communication relays may be controlled by a field-programmable gate array (FPGA) circuit inside the passenger emergency communication unit. When the communication button is pushed down, a button-pushing signal is output to the FPGA circuit, and the FPGA circuit controls the normally-closed contact pairs to disconnect in linkage manner till the button is reset by the driver/OCC, and the FPGA circuit controls the normally-closed contact pairs to return to the closed state.

Normally, the emergency communication circuit is active high. Once the passenger requests the communication, the circuit is cut off and an active low output is the communication signal.

The activating signal sent out by the button is connected to the processor. The processor communicates with the host of the passenger information system in the coaches through the communication bus. The host of the passenger information system in the coaches is connected to the host of the passenger information system in the driver's cab through the CAN bus or/and the Ethernet bus. The host of the passenger information system in the driver's cab communicates with the TCMS through the MVB bus. This part of technical features is the same as that in the prior art.

The method of controlling the passenger communication output by using the passenger communication output control circuit in the present embodiment is described below.

The passenger pushes down the communication button of the passenger emergency communication unit, the normally-closed contact pair of the communication relay linked to the communication button is disconnected. The emergency communication circuit connected to the input/output module of the TCMS in the corresponding coach is cut off. TCMS detects the broken circuit signal to determine the coach where the communication request is sent out.

The passenger pushes down the communication button of the passenger emergency communication unit, the normally-open contact pair of the communication button is closed. The passenger emergency communication unit sends the communication signal to the host of the passenger information system in the coach, then the host of the passenger information system in the driver's cab sends the communication signal to the TCMS, and the TCMS sends the communication signal to the OCC for communication and display. After the OCC receives the signal, the working personnel can check out the communication request and view the video shot by the camera to learn the situation in the coaches in time.

Other than the above-mentioned embodiments, the present disclosure may have other implementations. Any technical solution derived from equivalent substitutions or equivalent modifications should be considered as falling within the scope of the present disclosure.

What is claimed is:

1. A passenger communication output control circuit for an unmanned metro train, the unmanned metro train being installed with passenger emergency communication units, each of the passenger emergency communication units having a communication button, wherein the passenger emergency communication units further comprise communication relays, the communication relays each have a normally-closed contact pair linked to the communication button in a one-to-one correspondence, when the communication button is pushed down, a corresponding communication relay is energized to disconnect the normally-closed contact pair, the normally-closed contact pairs of the communication relays of all coaches of the metro train are connected in series to form an emergency communication circuit, and two terminals of the emergency communication circuit are respectively connected to a train power supply and an input/output module of a train control management system (TCMS) in the coaches of the metro train.

2. The passenger communication output control circuit for the unmanned metro train according to claim 1, wherein a driver's cab is also provided with a passenger emergency communication unit and a communication relay, two ends of a normally-closed contact pair of the communication relay in the driver's cab are respectively connected to the train power supply and an input/output module of the TCMS in the driver's cab.

3. The passenger communication output control circuit for the unmanned metro train according to claim 1, wherein a driver's cab is also provided with a passenger emergency communication unit and a communication relay, a normally-closed contact pair of the communication relay in the driver's cab is serially connected to the emergency communication circuit of a coach next to the driver's cab; or, the normally-closed contact pair of the communication relay in the driver's cab is serially connected to the emergency communication circuit of the coach next to the driver's cab then connected to the input/output module of the TCMS in the driver's cab.

4. The passenger communication output control circuit for the unmanned metro train according to claim 1, wherein each of the passenger emergency communication units comprises a processor, a communication speaker, a camera, a microphone, and an indicator lamp; the communication speaker, the camera, the microphone, and the indicator lamp are connected to the processor, the communication button has a normally-open contact pair, the normally-open contact pair and the communication relay are both connected to the processor, the processor communicates with a host of the passenger information system in the coach through a communication bus, the host of the passenger information system in the coach is connected to a host of the passenger information system in a driver's cab through a CAN bus or/and an Ethernet bus, and the host of the passenger information system in the driver's cab communicates with the TCMS through a train bus.

5. The passenger communication output control circuit for the unmanned metro train according to claim 1, wherein the communication relay is provided inside the passenger emergency communication unit.

6. A passenger communication output control method for the unmanned metro train, wherein the method is implemented by using the passenger communication output control circuit according to claim 1.

7. A passenger communication output control method for an unmanned metro train, comprising
  disconnecting a normally-closed contact pair of a communication relay linked to a communication button when a passenger pushes down the communication button of a passenger emergency communication unit,
  cutting off an emergency communication circuit connected to an input/output module of a TCMS in a corresponding coach, and
  detecting, by the TCMS, a broken circuit signal to determine the coach where a communication request is sent out.

8. The passenger communication output control method for the unmanned metro train according to claim 7, wherein when a passenger pushes down the communication button of the passenger emergency communication unit, the normally-open contact pair of the communication button is closed, the passenger emergency communication unit sends a communication signal to a host of a passenger information system in the coach, a host of the passenger information system in a driver's cab sends the communication signal to the TCMS, and then the TCMS sends the communication signal to an operational control center for communication and display.

* * * * *